US008862686B2

(12) United States Patent
McGee et al.

(10) Patent No.: US 8,862,686 B2
(45) Date of Patent: Oct. 14, 2014

(54) SYSTEM AND METHOD FOR PROVIDING SHARED WEB MODULES (75) Inventors: Jason Robert McGee, Apex, NC (US); Michael John Morton, Cary, NC (US); Brent A. Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1410 days.

(21) Appl. No.: 10/650,894

(22) Filed: Aug. 28, 2003

(65) Prior Publication Data

US 2005/0050155 A1    Mar. 3, 2005

(51) Int. Cl.
G06F 15/167    (2006.01)
G06F 15/177    (2006.01)
G06F 15/173    (2006.01)
G06F 15/16    (2006.01)
H04L 29/08    (2006.01)
G06F 9/445    (2006.01)
G06F 9/48    (2006.01)
H04L 29/06    (2006.01)

(52) U.S. Cl.
CPC ............... *H04L 67/34* (2013.01); *G06F 9/445* (2013.01); *G06F 9/44521* (2013.01); *G06F 8/54* (2013.01); *G06F 9/4843* (2013.01); *H04L 29/06* (2013.01); *H04L 69/329* (2013.01)
USPC ............ 709/213; 709/221; 709/224; 709/218

(58) Field of Classification Search
USPC .................. 709/201–203, 213–215, 220–222
See application file for complete search history.

(56) References Cited

U.S. PATENT DOCUMENTS

| 5,966,702 | A | 10/1999 | Fresko et al. ............... 707/1 |
| 6,208,991 | B1 | 3/2001 | French et al. ............... 707/10 |
| 6,229,539 | B1 * | 5/2001 | Morcos et al. ............... 715/808 |
| 6,249,291 | B1 | 6/2001 | Popp et al. ............... 345/473 |
| 6,370,549 | B1 * | 4/2002 | Saxton ............... 707/205 |
| 6,519,594 | B1 * | 2/2003 | Li ............... 707/10 |
| 6,530,080 | B2 | 3/2003 | Fresko et al. ............... 717/166 |
| 6,721,777 | B1 * | 4/2004 | Sharma ............... 718/101 |
| 7,089,317 | B2 * | 8/2006 | Jeyaraman et al. ............... 709/230 |
| 7,185,342 | B1 * | 2/2007 | Carrer et al. ............... 719/313 |
| 7,207,041 | B2 * | 4/2007 | Elson et al. ............... 718/104 |
| 7,287,259 | B2 * | 10/2007 | Grier et al. ............... 719/331 |
| 2001/0034743 | A1 | 10/2001 | Thomas ............... 707/501.1 |
| 2002/0007376 | A1 | 1/2002 | Popp et al. ............... 707/513 |
| 2002/0010671 | A1 | 1/2002 | Tsai ............... 705/37 |
| 2002/0049788 | A1 * | 4/2002 | Lipkin et al. ............... 707/513 |
| 2002/0049963 | A1 | 4/2002 | Beck et al. ............... 717/130 |
| 2002/0129345 | A1 * | 9/2002 | Tilden et al. ............... 717/162 |
| 2003/0033310 | A1 | 2/2003 | Factor et al. ............... 707/100 |

(Continued)

*Primary Examiner* — Richard G Keehn
(74) *Attorney, Agent, or Firm* — Steven M. Greenberg, Esq.; CRGO Law (57) ABSTRACT

A system, apparatus, and method for sharing web modules amongst a plurality of other web applications are provided. Shared web modules are stored in an archive data structure for use with web applications. The web applications, and/or the web modules of the web applications, may include a designation file that identifies the shared web modules that are to be incorporated into the web modules for the web application. A runtime component selectively locates these shared web modules and logically merges them with the web modules of the web application according to precedence or priority of the shared web modules as designated by the shared web module designation file. The result is a logically merged web module that contains the shared web modules referenced in the shared web module designation file.

17 Claims, 4 Drawing Sheets

(56) References Cited

U.S. PATENT DOCUMENTS

| | | | |
|---|---|---|---|
| 2003/0088851 A1 | 5/2003 | Harscoet | 717/116 |
| 2003/0093420 A1* | 5/2003 | Ramme | 707/3 |
| 2003/0191826 A1* | 10/2003 | Bellinger et al. | 709/220 |
| 2003/0229888 A1* | 12/2003 | Spotswood et al. | 717/116 |
| 2004/0054793 A1* | 3/2004 | Coleman | 709/229 |
| 2004/0117372 A1* | 6/2004 | Kasman | 707/9 |
| 2004/0122912 A1* | 6/2004 | Kim et al. | 709/217 |
| 2004/0172618 A1* | 9/2004 | Marvin | 717/116 |
| 2004/0205564 A1* | 10/2004 | Brayton et al. | 715/513 |
| 2004/0205692 A1* | 10/2004 | Robinson | 717/100 |
| 2004/0255233 A1* | 12/2004 | Croney et al. | 715/500 |
| 2004/0255293 A1* | 12/2004 | Spotswood | 717/176 |

\* cited by examiner

FIG. 6
```
<shared-web-module-config>
    <web-module name="DefaultWebApplication" mergePriority="2">
        <shared-web-module uri="${APP_INSTALL_ROOT}/
SharedWebModulesApp/jsp.war" mergePriority="1"/>

<shared-web-module uri="${APP_INSTALL_ROOT}/
SharedWebModulesApp/common.war" mergePriority="3"/>

</web-module>
</shared-web-module-config>
```

SYSTEM AND METHOD FOR PROVIDING SHARED WEB MODULES

BACKGROUND OF THE INVENTION

1. Technical Field

The present invention is directed to a system and method for providing shared web modules. More specifically, the present invention is directed to a system and method for logically merging shared web modules with a primary web module to generate a logically merged web module.

2. Description of Related Art

The programming model associated with Java 2 Enterprise Edition (J2EE) mandates an application packaging structure that consists of an archive, e.g., Enterprise Archive (EAR), that in turn contains one more sub-archives, e.g., web archive (WAR), Enterprise Java Bean (EJB) archive (JAR), Resource Archive (RAR), etc. The EAR file encapsulates all these archives required by the application for executing in the J2EE environment. A WAR file contains the "web" related files (Java, HTML, GIFs, etc.) that are required typically for HTTP clients, e.g., browsers.

It is very often the case that application developers have code and configurations that are identical across multiple WARs, also referred to as web modules. Since this code and configuration is identical in a plurality of web modules, rather than rewriting or copying these common portions of code and configurations into each web module, it would be desirable to be able to share a web module having this code/configuration amongst a plurality of web modules. However, there is no current mechanism for allowing web modules to be shared.

To the contrary, the present mechanisms are limited in that the common code/configuration must be explicitly inserted by the application developer into the web modules. For example, assume that there is a web module that contains 100 JSP files. Now assume that two more web modules are developed that also need to contain these same JSP files. With the present mechanisms, the application developer must copy all of the JSP files into each of the new web modules. This is clearly an inefficient use of storage and, in addition, raises maintenance issues since any future changes to one or more of the JSP files must now be rippled through all of the web modules.

As another example, assume that there are 100 web modules that all have the same security requirements. For example, all of the web modules must be configured with the same User Role. This requires the application developer to perform the same security configuration steps during the web module assembly phase for each web module thereby requiring much human effort and time. In addition, a similar maintenance issue is raised in that, when a change to the User Role is made, this change must be propagated to each of the 100 web modules.

Thus, it would be beneficial to have a mechanism that permits the sharing of web modules by other web modules in a manner that maximizes storage efficiency and reduces maintenance issues with regard to future changes in the shared web modules.

SUMMARY OF THE INVENTION

The present invention provides a system and method for sharing web modules amongst a plurality of other web applications. With the system and method of the present invention, shared web modules are stored in an archive data structure and are accessible for use with web applications. The web applications, and/or web modules of the web applications, may include a shared web module designation file that identifies the shared web modules that are to be incorporated into the web modules for the web application.

A runtime component is provided that determines, whether the web application and/or web modules have a shared web module designation file that identifies shared web modules that are to be incorporated into the web modules of the web application. If so, the runtime component locates these shared web modules and logically merges them with the web module of the web application taking into account precedence or priority of the shared web modules as designated by the shared web module designation file. The result is a logically merged web module that contains the shared web modules referenced in the shared web module designation file.

Thus, with the present invention, rather than having to copy the shared web modules into each web application web module that is to make use of the shared web module, the present invention permits a reference to the shared web module to be used in the web application web module that references a shared web module at a particular storage location. The mechanisms of the present invention automatically merges the shared web module with the web application web module when the web application web module is loaded by the runtime environment.

Moreover, since only one copy, or in some cases a relatively few number of copies, of the shared web module is referenced by a plurality of web applications, maintenance issues are significantly reduced. That is, rather than having to propagate changes to the shared web module down to each web application web module that makes use of the code in the shared web module, the present invention automatically performs such propagation by virtue of the logical merging of the shared web module with the web application web modules at load time. Thus, the changes need only be made to the copy of the shared web module that is stored in the shared web module library and need not be explicitly made to each web application that makes use of the shared web module.

These and other features and advantages of the present invention will be described in, or will become apparent to those of ordinary skill in the art in view of, the following detailed description of the preferred embodiments.

BRIEF DESCRIPTION OF THE DRAWINGS

The features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides a mechanism for sharing web modules amongst a plurality of web application web modules. As such, the present invention is particularly suited for use in a distributed data processing environment, although the present invention may also have use with stand alone or client computing devices. Thus, in the interests of providing a context in which to understand the description of the preferred embodiments of the present invention, the following will provide a brief description of an exemplary distributed data processing environment in which the present invention may be implemented.

Figure 1:
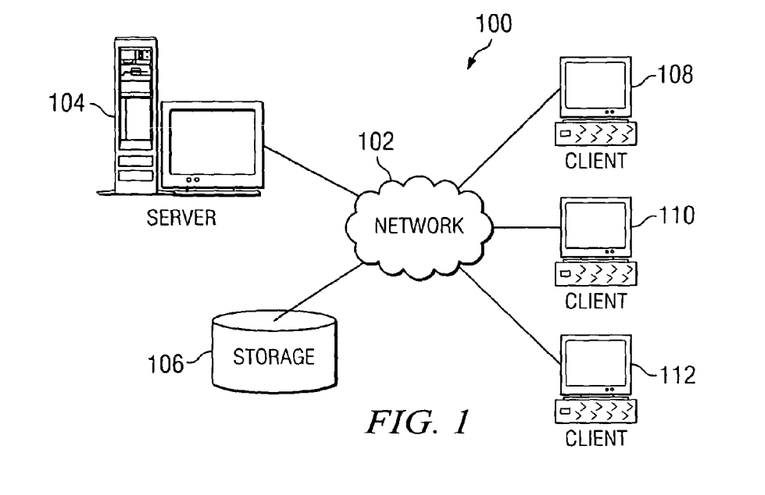
FIG. 1 is an exemplary block diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
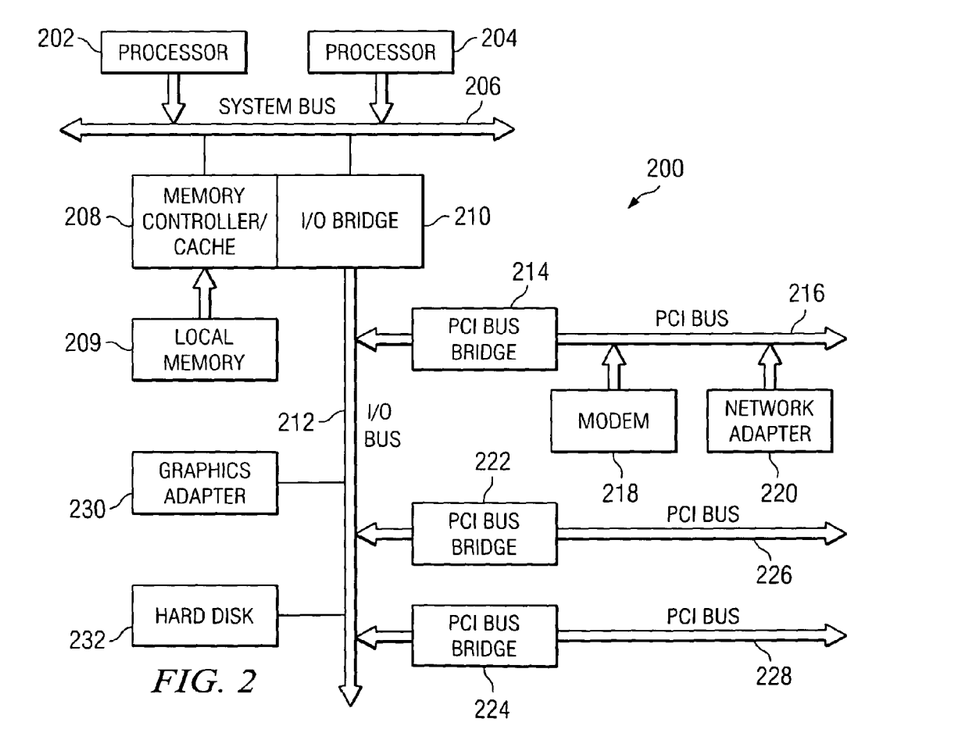
FIG. 2 is an exemplary block diagram of a server computing device in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system. However, those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention provides a system and method for logically merging web modules that have been designated as web modules to be shared amongst a plurality of web applications, with the web modules of the web applications based on references to the shared web modules in the web application web modules. The mechanisms of the present invention perform the merging of the shared web modules in accordance with priorities and precedence of the shared web modules. The present invention further resolves any conflicts between shared web modules based on these priorities and precedence.

The primary components of the present invention include a core runtime environment component and a web container component. The core runtime environment component is responsible for identifying web applications, during initialization of the web applications, that have web modules that inherit shared web modules. The core runtime environment component then merges these shared web modules with the existing web modules of the web application and thereby generates logically merged web modules. The core runtime environment component then informs the web container component to load the logically merged web modules.

A web container is the execution infrastructure for operating web applications. Web applications, in the context of the present description, mean applications on the server side that perform some processing operations, such as analyzing input data from clients and generating dynamic HTML pages, using various functions provided by the web container. Examples of such web applications include Java Server Pages (JSPs) and servlets.

Figure 3:
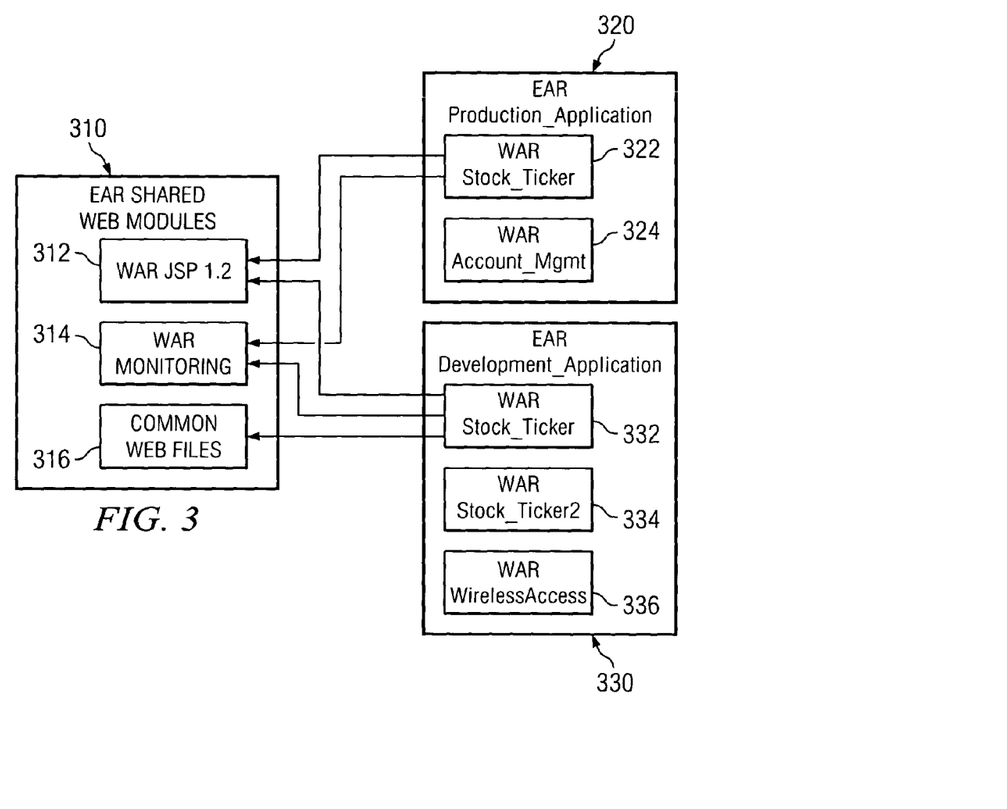
FIG. 3 is an exemplary block diagram illustrating the sharing of web modules in accordance with the present invention.

With reference now to FIG. 3, an exemplary block diagram is shown that illustrates the sharing of web modules in accordance with the present invention. As shown in FIG. 3, two Web application enterprise archives (EAR) 320 and 330 are illustrated that contain various web archive (WAR) files, e.g., Stock_Ticker 322, Account_Mgmt 324, Stock_Ticker 332, Stock_Ticker2 334 and WirelessAccess 336. In addition, a shared web modules library is provided in EAR 310. The web modules 312-316 of the EAR 310 are designated as shared web modules by virtue of their inclusion in EAR 310 and thus, may be logically merged with web application web modules in accordance with the mechanisms of the present invention, as discussed in greater detail hereafter.

The Production_Application EAR 320 contains WAR Stock_Ticker 322 which inherits the shared web modules JSP 1.2 312 and Monitoring 314 in that respective order. Thus, at application initialization time, i.e. when the Production_Application 320 is loaded into the Web Container, the runtime components of the present invention perform a logical merge of all these web modules and generates one virtual web module which the Web Container then loads.

The same is true for the web module Stock_Ticker 332 of Development_Application EAR 330. The web module Stock_Ticker 332 inherits the shared web modules JSP1.2 312, Monitoring 314, and Common Web Files 316. By operation of the present invention, a virtual web application that is a logically merged version of the web application web module and the shared web modules will be generated and loaded by the Web Container. Thus, the present invention provides a dynamic generation of a logically merged web application that is used to load a web application using shared web modules.

The merging operation of the present invention is a logical ordered merge of a plurality of web modules. The reason that the merge operation is order dependent is to be able to establish a precedence to provide the ability to override web resources. The ordering is established by way of designated priorities or precedence associated with the shared web modules. Thus, for example, if the JSP 1.2 web module 312 has a higher priority than the Monitoring web module 314, then any conflicts between the web resources of these two web modules would be resolved in favor of the JSP 1.2 web module 312 by virtue of the priorities or precedence. The merging of web modules will be discussed in greater detail hereafter.

The term "logically merged" web application means that the data structure that defines the web application is a combination of existing web module code in the web application and a copy of the shared web module code. For example, assume that a first web module A contains the files web.xml, servletA.class and pageA.html, and a second web module B contains the files web.xml, servletB.class and pageB.html. The logically merged web application resulting from a merge of the first web module and the second web module would consist of the files web.xml, servletA.class, servletB.class, pageA.html and pageB.html.

In the example above, the resulting merged web application is described in terms of what the merged web application would look like physically on the disk to which the merged web application is written. The "logical" merging of web modules, however, involves identifying the paths where the files are physically located and adding these paths to the ClassPath for the entire web application. In Java terms, this means that when the application is loaded by the server, the server needs to know the physical storage locations of the files referenced by the merged web application. Thus, using the example discussed above, all of the paths to the storage locations where the files for web module A and web module B are stored will be added to the ClassPath for the merged web application.

In addition, each web module is required to contain a web.xml file per the Servlet Specification. The logical merge operation of the present invention merges each of these individual web.xml files into a single web.xml file for the merged web application. This merging of web.xml files may be performed in any of a plurality of different ways. One exemplary technique for merging the web.xml files is simply to copy portions of one web.xml file into another web.xml file. Of course any conflicts between the web.xml files will need to be resolved in accordance with the priorities or precedence established for the web modules. For example, assume that web module A has a web.xml file that has the following contents:

```
<web-app id="WebApp_ID">
    <display-name>Michaels Application</display-name>
    <description>This is Michaels Web Application.</description>
    <servlet id="Servlet_1">
        <servlet-name>Michael Servlet</servlet-name>
        <display-name>Michael Servlet</display-name>
        <description>This servlet returns information about Michael's
favorite beers.</description>
            <servlet-class>servletA</servlet-class>
            <load-on-startup></load-on-startup>
    </servlet>
    <servlet-mapping id="ServletMapping_1">
        <servlet-name>Michael Servlet</servlet-name>
        <url-pattern>/Michael/*</url-pattern>
    </servlet-mapping>
    <welcome-file-list id="WelcomeFileList_1">
        <welcome-file>pageA.html</welcome-file>
    </welcome-file-list>
</web-app>
```

Now assume that web module B has a web.xml file that has the following contents:

```
<web-app id="WebApp_ID">
    <display-name>Steves Application</display-name>
    <description>This is Steves Web Application.</description>
    <servlet id="Servlet_1">
        <servlet-name>Steve Servlet</servlet-name>
        <display-name>Steve Servlet</display-name>
        <description>This servlet returns information about Steve's
favorite foods.</description>
            <servlet-class>servletB</servlet-class>
            <load-on-startup></load-on-startup>
    </servlet>
    <servlet-mapping id="ServletMapping_1">
        <servlet-name>Steve Servlet</servlet-name>
        <url-pattern>/steve/*</url-pattern>
    </servlet-mapping>
    <welcome-file-list id="WelcomeFileList_1">
        <welcome-file>pageB.html</welcome-file>
    </welcome-file-list>
</web-app>
```

Assume now that the resulting merged web.xml file obtained from the merge of the above web.xml files has the following contents:

```
<web-app id="WebApp_ID">
    <display-name>Steves Application</display-name>
    <description>This is Steves Web Application.</description>
    <servlet id="Servlet_1">
        <servlet-name>Steve Servlet</servlet-name>
        <display-name>Steve Servlet</display-name>
        <description>This servlet returns information about Steve's
favorite foods.</description>
            <servlet-class>servletB</servlet-class>
            <load-on-startup></load-on-startup>
    </servlet>
    <servlet id="Servlet_2">
        <servlet-name>Michael Servlet</servlet-name>
        <display-name>Michael Servlet</display-name>
        <description>This servlet returns information about Michael's
```

```
        favorite beers.</description>
            <servlet-class>servletA</servlet-class>
            <load-on-startup></load-on-startup>
        </servlet>
        <servlet-mapping id="ServletMapping_1">
            <servlet-name>Steve Servlet</servlet-name>
            <url-pattern>/steve/*</url-pattern>
        </servlet-mapping>
        <servlet-mapping id="ServletMapping_2">
            <servlet-name>Michael Servlet</servlet-name>
            <url-pattern>/Michael/*</url-pattern>
        </servlet-mapping>
        <welcome-file-list id="WelcomeFileList_1">
            <welcome-file>pageB.html</welcome-file>
        </welcome-file-list>
    </web-app>
```

From the above, it can be seen that the merge of the two web.xml files for web module A and web module B would result in a conflict between the lines in the files:

```
            <welcome-file-list id="WelcomeFileList_1">
                <welcome-file>pageA.html</welcome-file>
            </welcome-file-list>
            and
            <welcome-file-list id="WelcomeFileList_1">
                <welcome-file>pageB.html</welcome-file>
            </welcome-file-list>
```

However, the priority or precedence established for the web modules in accordance with the present invention dictates how this conflict is resolved. Since web module B is given a higher priority or precedence in this particular example, the result of resolving this conflict is to include the lines from the web.xml file for web module B in the resulting merged web.xml file. Similar resolving of conflicts between files in merged web modules may be performed for files other than the web.xml file.

Thus, the resulting logically merged web application includes the various web modules of the original web application and the shared web modules along with a single ClassPath that identifies the paths to each of the files of each of the web modules in the merged web application and includes a single merged web.xml file.

Figure 4:
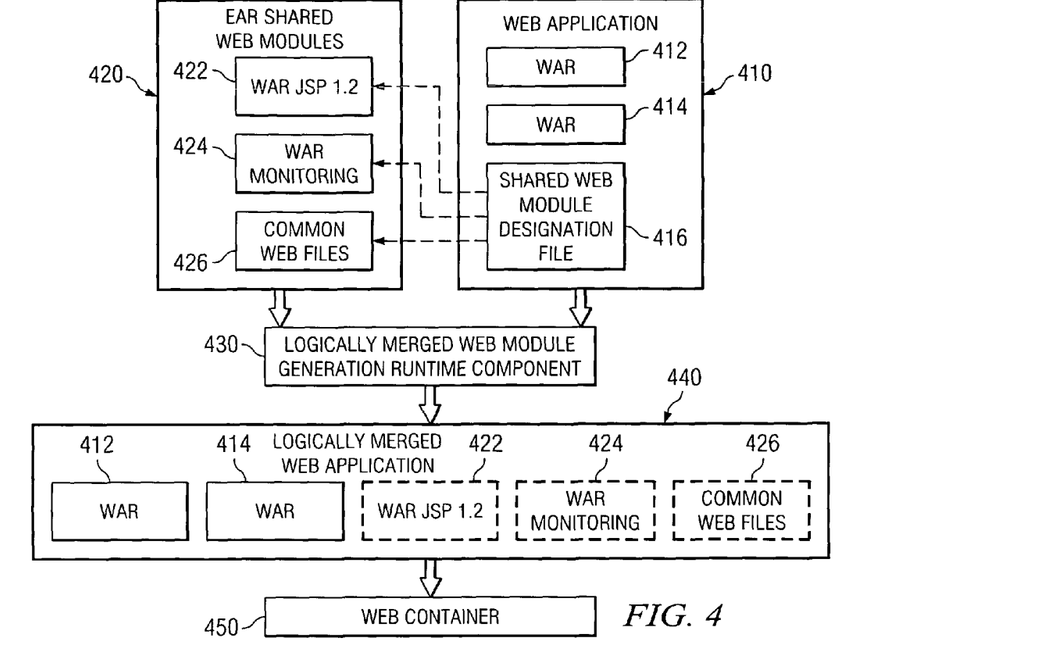
FIG. 4 is an exemplary block diagram illustrating the generation of a logically merged web module in accordance with one exemplary embodiment of the present invention.

FIG. 4 is an exemplary block diagram illustrating the generation of a logically merged web module in accordance with one exemplary embodiment of the present invention. As shown in FIG. 4, the web application 410 includes archive files 412 and 414 and also a shared web module designation file 416. The archive files 412 and 414 are web archive (WAR) files in the depicted exemplary embodiment. However, other types of archive files may be included in addition to, or in replacement of, the WAR files. These other types of archive files may include, for example, Enterprise Java Bean (EJB) archive files, Resource Archive (RAR) files, and the like.

In addition, while the example depicted in FIG. 4 illustrates the shared web module designation file 416 being stored in the web application 410, e.g., the EAR file for the web application, the present invention is not limited to such. The shared web module designation file 416 may be stored as a separate file that is part of a parent web module file, as bindings or extensions in a parent web module file, as part of the parent web module web.xml file, in the parent web application file as a separate file (as depicted), in the parent web application file as bindings or extensions, in the parent web application file application.xml, or the like.

In a preferred embodiment, as depicted, the shared web module designation file 416 is a separate file that is part of the web application EAR file. In such an embodiment, the shared web module designation file 416 includes all the descriptors that reference the shared web modules 422-426 for all the web modules 412-414 of the web application 410. In this way, the descriptor information required for each web module 412-414 of the web application is provided upfront as opposed to only discovering the dependencies one at a time for each parent web module 412-414 in the web application 410. This may allow pre-fetching/stashing of the shared web module information prior to the processing that takes place for each individual web module during the initializing of the web application 410. Thus, for purposes of explanation of the exemplary preferred embodiment, the present invention will be described in terms of the shared web module designation file 416 being stored at a web application 410, or EAR, level.

As touched on above, the shared web module designation 416 stores the descriptors of the shared web modules 422-426 that are to be logically merged with the web modules 412-414 of the web application 410. These descriptors may include, for example, filename (and possibly the path) for the shared web module and a merge priority for the shared web module. The path and filename are used to fetch the shared web module information that is used to perform the merging of the shared web module, e.g., web module 424, with the existing web modules 412-414 in the web application 410. The merge priority is used to resolve conflicts between web modules during the merge operation, as discussed in greater detail hereafter.

When the web application 410 is deployed in a runtime environment of a server computing device, such as the server computing device illustrated in FIG. 2, the web application 410 undergoes an initialization process. During this initialization process, the runtime environment processes all of the web modules 412-414 of the web application 410, e.g., EAR file, and notifies the web container 450 to load, i.e. start, the web module that the runtime environment component passes to the web container. With the present invention, the runtime environment is provided with additional components 430 for identifying whether a web application makes use of shared web modules and if so, merges those web modules into a logically merged web module.

The runtime environment components 430 of the present invention look at the web application and/or web modules of the web application, to determine if a shared web module designation file 416 is present. If so the runtime environment components 430 merge the designated shared web modules with the existing web modules of the web application in accordance with the priorities or precedence set in the shared web module designation file 416 for each shared web module that is to be merged.

The merging of the shared web modules 422-426 with the existing web modules 412-414 involves resolving conflicts between the web resources of the shared web modules 422-426 and the existing web modules 412-414 based on priorities or precedence. In addition, relinking of merged shared web modules 422-426 with the existing web modules 412-414, extrapolating policy information from a policy file in the web application 410 for the shared web modules 422-426 that are being merged, and the like, may be necessary to perform the merge operation. All of the various functions to be performed in the merging of the web modules may be designated in a service provider interface (SPI) that provides the merge logic for merging of different file types. The result of these merge operations is a logically merged web application 440 that may be loaded by the web container 450 for use on the server computing device.

Once the logically merged web application 440 is generated using the runtime environment components 430 of the present invention, the logically merged web application 440 is provided to the web container 450 for loading. The web container 450, as specified in the Servlet Specification, provides various application program interfaces (APIs) that provide path information to web module resources. Therefore, for a logically merged web module, the web container 450 identifies the paths to the merged shared web modules 422-426 such that a user application may make use of the getRealPath( ) API and getPathTranslated( ) API and obtain the location, on the local file system of the requested web module resource. The getRealPath( ) API returns the location of the file on a local file system. The getPathTranslated( ) API returns any extra path information after the servlet name but before any query string and translates it into a real path.

The web container 450 loads each of the web modules, including the logically merged shared web modules 422-426, of the logically merged web application 440 in a manner generally known in the art. Once the web modules are loaded, the web application is available for use by the server computing device.

Figure 5:
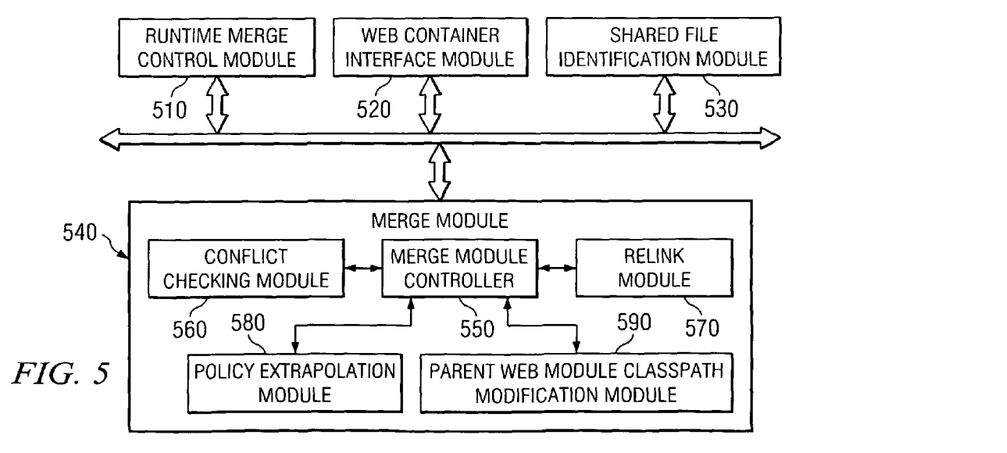
FIG. 5 is an exemplary block diagram of a logically merged web module generation runtime component in accordance with one exemplary embodiment of the present invention.

FIG. 5 is an exemplary block diagram of a logically merged web module generation runtime component, hereafter referred to as the runtime component, in accordance with one exemplary embodiment of the present invention. As shown in FIG. 5, the runtime component includes a plurality of sub-components including a runtime merge control module 510, a web container interface module 520, a shared file identification module 530 and a merge module 540 that are in communication with one another. The merge module 540 further includes a merge module controller 550, a conflict checking module 560, a relink module 570, a policy extrapolation module 580, and a parent web module classpath modification module.

The runtime merge control module 510 controls the overall operation of the runtime component and orchestrates the operation of the other components 520-540. The runtime merge control module 510 looks at the web application that is being initialized to determine if there are any shared web modules that need to be merged prior to loading of the web application by the web container. If so, the runtime merge control module 510 instructs the shared file identification module 530 to read the shared web module designation file of the web application and identify the shared web modules that must be merged along with their priorities or precedence as set in the shared web module designation file. This information is then passed to the merge module 540 for use in merging the shared web modules with the existing web modules of the web application to generate a logically merged web application.

The merge module controller 550 of the merge module 540 merges the shared web modules identified by the shared file identification module 530. The merge module controller 550 enlists the assistance of the conflict checking module 560 to determine conflicts in web resources between web modules that are being merged. The conflict checking module 560 uses the identified precedence or priority of the shared web modules to determine how to resolve the conflicts, if any.

In addition, the merge module controller 550 uses the relink module 570 to relink references to the shared web modules in the existing web modules of the web application. The policy extrapolation module 580 may be used to extrapolate policy information for the merged shared web modules from a policy file associated with the web application. The parent web module classpath modification module 590 may be used by the merge module controller 550 to add the location/path of the storage location of each module involved in the merge processing to the ClassPath of the parent module.

The operation of these components 550-590 on the shared web modules identified by the shared file identification module 530 results in a logically merged web application that is output to the web container via the web container interface module 520. The web container then loads the web modules of the logically merged web application and the web application is ready for use by the server.

Figure 6:
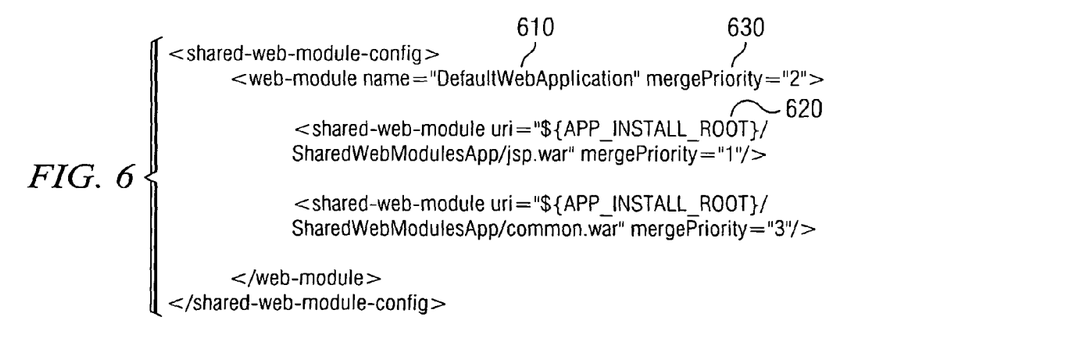
FIG. 6 is an exemplary diagram of a shared web module designation file in accordance with one exemplary embodiment of the present invention.

FIG. 6 is an exemplary diagram of a shared web module designation file in accordance with one exemplary embodiment of the present invention. As shown in FIG. 6, the shared web module designation file includes a listing of shared web modules that includes the shared web module's name 610, an optional path to the shared web module 620, and a merge priority 630. The name 610 and path 620 are used by the mechanisms of the present invention to locate the shared web module in order to generate and load the logically merged web application. The merge priority is used to resolve conflicts between web resources of the shared web modules that are to be merged, as discussed previously.

Figure 7:
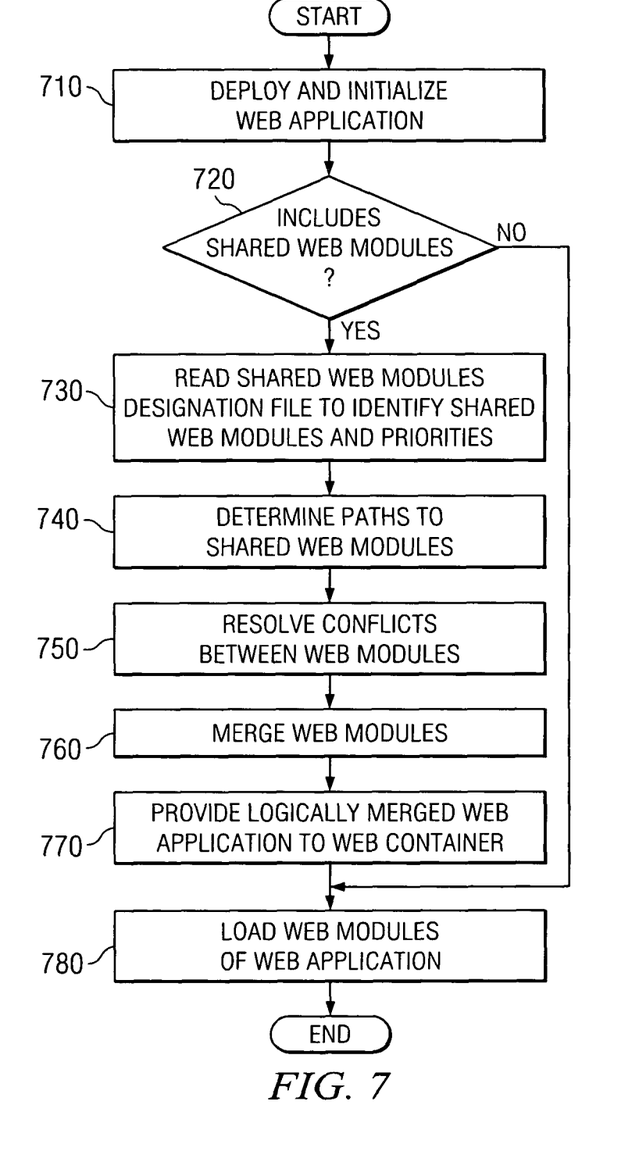
FIG. 7 is a flowchart outlining an exemplary operation of the present invention when generating a logically merged web module.

FIG. 7 is a flowchart outlining an exemplary operation of the present invention when generating a logically merged web module. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 7, the operation of this exemplary embodiment of the present invention starts with deployment and initialization of a web application (step 710). During the initialization process, a determination is made as to whether the web application includes shared web modules that need to be logically merged with the existing web modules (step 720). If not, the operation continues to step 780 where the web modules of the web application are loaded by the web container and the web application is made available for use by the server.

If the web application includes shared web modules that need to be logically merged, the operation reads the shared web files designation file of the web application and identifies the shared web modules to be merged along with their priorities (step 730). The paths to the shared web modules are determined (step 740) and any conflicts between web resources of the shared web modules are resolved using the identified priorities (step 750). The shared web modules are then merged with the existing web modules of the web application to generate a logically merged web application (step 760). The logically merged web application is then provided to the web container (step 770) which loads the web modules of the logically merged web application and makes them available for use by the server (step 780). The operation then terminates.

Thus, the present invention provides a mechanism by which web modules may be shared with a plurality of web applications. This allows web applications to reference the shared web modules without having to copy the contents of the web modules into the web application. Moreover, since the shared web modules are centralized, modifications to these shared web modules may be easily made and distributed to each web application making use of the shared web module.

It should be noted that while the present invention is described in terms of shared web modules being combined with existing web modules of an EAR or other type of web application, the present invention is not limited to such. Rather, the EAR or web application need not have existing web modules and may include the shared web module designation file without any other web modules being present in the EAR or web application. Thus, the logical merging performed by the present invention in such a case would result in a logically merged web application that includes only shared web modules as designated by the shared web module designation file.

In addition, while the present invention is described in terms of the logical merging of the web application web modules with the shared web modules being performed at application load time by the runtime environment, the present invention is not limited to such. Rather, the present invention may be used "offline", i.e. prior to application load time, to generate a logically merged web application which may then be loaded by the runtime environment. This may help increase the performance of the server or computing device in which the runtime environment operates by reducing the amount of computations needed during application load time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of generating a logically merged web application, comprising:
   initializing a runtime environment for a web application;
   during the initialization process of the runtime environment, determining whether the web application includes shared web modules that need to be logically merged with existing web modules of the web application, logically merged referring to a data structure defining the logically merged web application, the data structure combining both code of the existing web modules of the web application and also a copy of code of the shared web modules;
   upon determining that the web application includes shared web modules that need to be logically merged, reading a shared module designation file of the web application and identifying the shared web modules to be merged along with their priorities, the shared module designation file including descriptors of shared web modules for logically merging with existing web modules of the web application, the descriptors identifying both a filename for each of the shared modules and also a priority for each of the shared web modules;
   determining paths to the shared web modules and resolving any conflicts between web resources of the shared web modules using the identified priorities in the shared module designation file by determining the priority associated with each shared web module and resolving any conflicts in favor of one of the shared web modules having a higher priority than a different one of the shared web modules; and,
   logically merging the shared web modules with the existing web modules of the web application to generate a logically merged web application.

2. The method of claim 1, further comprising:
   loading the logically merged web application into a web container.

3. The method of claim 2, wherein the container uses one or more application program interfaces (APIs) to identify paths to the shared web modules and loads the shared web modules when loading the logically merged web application.

4. The method of claim 1, wherein the web application is an enterprise archive (EAR) and wherein the logically merged web application is a logically merged EAR.

5. The method of claim 1, wherein the shared web modules includes at least one of a web archive (WAR) file, an enterprise java bean (EJB) archive file, and a resource archive (RAR) file.

6. The method of claim 1, wherein logically merging the shared web modules with the existing web modules of the web application includes using a service provider interface (SPI) that provides merge logic for merging different module types.

7. The method of claim 1, wherein logically merging the shared web modules with the existing web modules of the web application includes at least one of relinking references to the shared web modules in the web modules of the web application, extrapolating policy information for the shared web modules from a policy file associated with the web application, and modifying a class path for the web application to include paths to each of the shared web modules.

8. The method of claim 1, wherein the shared module designation file is one of a separate file that is stored as part of a parent web module file, at least one of bindings and extensions in the parent web module file, a part of the parent web module web.xml file, a separate file in a web application enterprise archive (EAR) file, at least one of bindings and extensions in the web application file, and a part of a web application application.xml file.

9. A computer program product in a computer readable storage device for generating a logically merged web application, comprising:
   computer executable instructions for initializing a runtime environment for a web application;
   computer executable instructions for, during the initialization process of the runtime environment, determining whether the web application includes shared web modules that need to be logically merged with existing web modules of the web application, logically merged referring to a data structure defining the logically merged web application, the data structure combining both code of the existing web modules of the web application and also a copy of code of the shared web modules;
   computer executable instructions for, upon determining that the web application includes shared web modules that need to be logically merged, reading a shared module designation file of the web application and identifying the shared web modules to be merged along with their priorities, the shared module designation file including descriptors of shared web modules for logically merging with existing web modules of the web application, the descriptors identifying both a filename for each of the shared modules and also a priority for each of the shared web modules;
   computer executable instructions for determining paths to the shared web modules and resolving any conflicts between web resources of the shared web modules using the identified priorities in the shared module designation file by determining the priority associated with each shared web module and resolving any conflicts in favor of one of the shared web modules having a higher priority than a different one of the shared web modules; and,
   computer executable instructions for logically merging the shared web modules with the existing web modules of the web application to generate a logically merged web application.

10. The computer program product of claim 9, further comprising:
   computer executable instructions for loading the logically merged web application into a web container.

11. The computer program product of claim 10, wherein the container uses one or more application program interfaces (APIs) to identify a path to each shared web module.

12. The computer program product of claim 9, wherein the computer executable instructions for logically merging the web modules of the web application include computer executable instructions for using a service provider interface (SPI) that provides merge logic for merging different module resources.

13. The computer program product of claim 9, wherein the computer executable instructions for logically merging the shared web modules with the existing web modules of the web application include computer executable instructions for relinking references to the web modules of the web application, computer executable instructions for extrapolating policy information for the shared web modules from a policy file associated with the web application, and computer executable instructions for modifying a class path for the web application to include paths to each of the shared web modules.

14. The computer program product of claim 9, wherein the shared module designation file is one of a separate file that is stored as part of a parent web module file, at least one of bindings and extensions in the parent web module file, a part of the parent web module web.xml file, a separate file in a web application enterprise archive (EAR) file, at least one of bindings and extensions in the web application file, and a part of a web application application.xml file.

15. An apparatus for generating a logically merged web module for a web application, comprising:
   a system bus;
   a local memory connected to the system bus, wherein the memory contains computer executable instructions;
   a processor connected to the system bus, wherein the processor executes the computer executable instructions to direct the apparatus to:
   initialize a runtime environment for a web application;
   during the initialization process of the runtime environment, determine whether the web application includes shared web modules that need to be logically merged with existing web modules of the web application, logically merged referring to a data structure defining the logically merged web application, the data structure combining both code of the existing web modules of the web application and also a copy of code of the shared web modules;
   upon determining that the web application includes shared web modules that need to be logically merged, read a shared module designation file of the web application and identifying the shared web modules to be merged along with their priorities, the shared module designation file including descriptors of shared web modules for logically merging with existing web modules of the web application, the descriptors identifying both a filename for each of the shared modules and also a priority for each of the shared web modules;
   determine paths to the shared web modules and resolving any conflicts between web resources of the shared web modules using the identified priorities in the shared module designation file by determining the priority associated with each shared web module and resolving any conflicts in favor of one of the shared web modules having a higher priority than a different one of the shared web modules; and,
   logically merge the shared web modules with the existing web modules of the web application to generate a logically merged web application.

16. The computer program product of claim 15, wherein the processor further executes the computer executable instructions to direct the apparatus to load the logically merged web application into a web container.

17. The apparatus of claim 15, wherein the shared module designation file is one of a separate file that is stored as part of a parent web module file, at least one of bindings and extensions in the parent web module file, a part of the parent web module web.xml file, a separate file in a web application enterprise archive (EAR) file, at least one of bindings and extensions in the web application file, and a part of a web application application.xml file.

* * * * *